A. G. COLLINS.
GARBAGE RECEIVER AND SINK STRAINER COMBINED.
APPLICATION FILED JUNE 27, 1913.

1,083,990.

Patented Jan. 13, 1914.

Inventor
Alvin G. Collins

UNITED STATES PATENT OFFICE.

ALVIN G. COLLINS, OF DETROIT, MICHIGAN.

GARBAGE-RECEIVER AND SINK-STRAINER COMBINED.

1,083,990.   Specification of Letters Patent.   Patented Jan. 13, 1914.

Application filed June 27, 1913.   Serial No. 776,033.

*To all whom it may concern:*

Be it known that I, ALVIN G. COLLINS, a citizen of the United States of America, residing at Detroit, in the county of Wayne and State of Michigan, have invented certain new and useful Improvements in Garbage-Receivers and Sink-Strainers Combined, of which the following is a specification, reference being had therein to the accompanying drawings.

This invention relates to new and useful improvements in garbage receiver and sink strainer combined and has for its object to do away with the unsightly garbage receptacles for sinks now in common use, by providing a recepacle which may be placed out of sight in the sink at the point where the common strainer and trap is ordinarily attached.

To this end the invention consists in attaching an outer vessel to the sink in such manner that the garbage receiver may be removably supported therein in a readily accessible manner without dispensing with the advantages of the ordinary strainer and trap all as more fully hereinafter described and claimed and shown in the accompanying drawing, in which—

Figure 1:
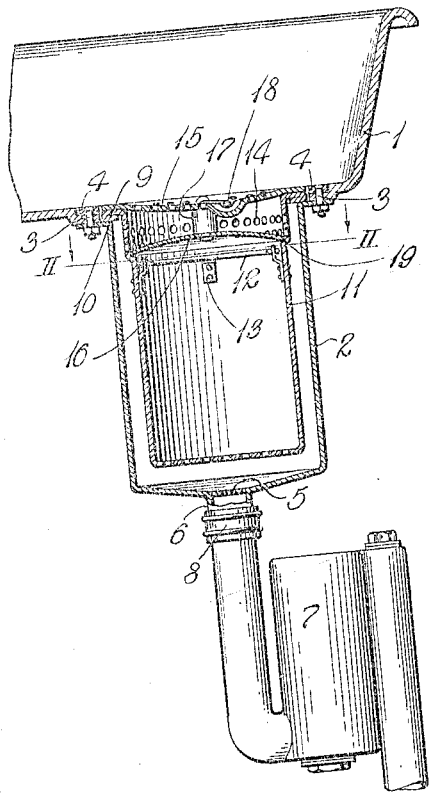
Figure 2:
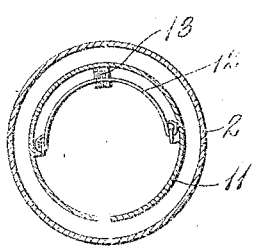
Figure 3:
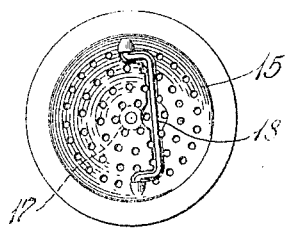

Figure 1 is a vertical central sectional view through a sink showing my improvement applied thereto, the trap being shown in elevation; Fig. 2 is a horizontal section on the line 2—2 of Fig. 1; Fig. 3 a plan view of the removable cover plate.

As shown in the drawings 1 indicates the sink, 2 an outer vessel flanged at its upper end and secured to the depressed flange (ordinarily intended to receive the common perforated sink strainer) by bolts 3 passing through the ring 4 and flanges of the sink opening and vessel 2 respectively, said vessel being provided at its lower end with a strainer 5 and outlet nipple 6 to which is attached the ordinary trap 7 by means of a union 8.

Removably supported within the vessel 2 by means of a flange 9 resting on a shoulder 10 formed by the flange of the vessel is a garbage receiver or receptacle 11 having a perforated bottom and provided with an interior bail or handle 12 below the top thereof and normally resting upon a shoulder or stop 13. Near the upper edge said receptacle is provided with an annular enlargement or shoulder immediately above which are provided one or more rows of perforations 14 in the wall of the receptacle.

A suitably combined cover and strainer is provided for the receptacle by means of two concavo-convex disks 15, 16 secured together by a suitable spacing block 17 so as to form a unit structure which may be readily removed from the receptacle by means of a bail or handle 18 lying in a depressed portion of the disk 15. The disk 16 is provided with perforations similar to those of an ordinary sink strainer and is intended to take the place thereof when the receptacle and cover are in place and water passing down through said perforations striking the convex surface of the disk 15 and being deflected out through the perforations 14 in the wall of the receptacle and down through the waste pipe. Any moisture contained in the garbage passing out through the perforated bottom of the receptacle to the waste pipe. It will thus be seen that by removing the cover the garbage may be placed in the receptacle and the moisture allowed to drip therefrom and after the receptacle is filled it may be readily emptied by removing the cover and lifting the receptacle out of the vessel by means of the bail 12 during which time, should the sink be used, the strainer in the bottom of the vessel 2 would prevent any garbage from accidentally getting into the waste pipe and clogging the same.

It will thus be seen that with my device the unsightly appearance of garbage in the sink is entirely done away with, and the device is accessible at all times by merely removing the cover and brushing the garbage into the receptacle.

Obviously, changes may be made in the details of construction without departing from the spirit of my invention and I do not care to limit myself to any particular form or arrangement of parts within the scope of the appended claims.

What I claim is:—

1. The combination with a sink having a drain opening, of an outer vessel supported at its upper end in the opening and provided at its lower end with an outlet, a garbage receptacle removably supported within the outer vessel, with lateral strainer openings in its upper portions, and a cover detachably secured in the receptacle below the strainer openings whereby it coöperates with the upper portion of the receptacle as a strainer delivering from the sink into the outer vessel.

2. The combination with a sink having a drain outlet and a waste pipe trap, of an outer vessel having its inlet co-incident with the sink opening in which it is secured and its outlet delivering into the waste pipe, a garbage receptable suspended at its upper end in the outer vessel and having a strainer opening through the upper portion thereof, and a cover sealing the lower part of the receptacle and coöperating with the upper portion as a strainer delivering into the outer vessel.

3. The combination with a sink having a drain opening, of an outer vessel supported near its upper end in the opening and adapted to deliver through an outlet in its lower end into a waste pipe, a garbage receptacle removably suspended by its upper end in the outer vessel and provided near its upper end with lateral strainer openings and with drain openings in its lower end, and a cover detachably secured in the garbage receptacle that seals the lower portion thereof and directs flow through the strainer openings of the receptacle into the outer vessel.

4. The combination with a sink having a drain opening, of an outer vessel supported by its upper end in the opening and adapted for pipe connection at its lower end, a garbage receptacle supported by its flanged upper end substantially concentric within the outer vessel and provided with lateral draining openings in its upper portion, and a cover having an imperforate convex disk forming a closure for the imperforate portions of the receptacle and with the concave disk forming a strainer for the mouth of the receptacle.

5. The combination with a sink having a drain opening, of an outer vessel supported by its upper end in the opening and adapted for pipe connection at its lower end, a garbage receptacle supported by its flanged upper end substantially concentric within the outer vessel and provided with lateral draining openings in its upper portion, a cover having an imperforate convex disk forming a closure for the imperforate portions of the receptacle and with the concave disk forming a strainer for the mouth of the receptacle, a bail handle secured to the strainer and adapted to fold down thereon, and a bail handle for the receptacle adapted to fold below the imperforate disk of the cover.

6. The combination with a sink having a drain opening, of an outer vessel having a flanged mouth removably secured in the sink opening, an outlet nipple at the lower end thereof, a garbage receptacle having a perforated bottom, a flange on the upper margin of the receptacle by which the receptacle is removably supported within the outer vessel, the receptacle having a slightly enlarged laterally perforated upper portion, a cover comprising a lower convex imperforate disk adapted to rest on the shoulder between the body of the receptacle and the enlarged upper portion thereof as a cover for the receptacle, and an upper concave perforated strainer disk secured by a spacing member to the lower disk and adapted to close the mouth of the receptacle as a strainer, a bail handle secured in the receptacle and adapted to fold beneath the cover, and a bail handle secured in the strainer disk and adapted to fold into a depression of the latter.

In testimony whereof I affix my signature in presence of two witnesses.

ALVIN G. COLLINS.

Witnesses:
C. R. STICKNEY,
G. E. McGRANN.